United States Patent
Norton et al.

(10) Patent No.: US 7,738,867 B2
(45) Date of Patent: Jun. 15, 2010

(54) METHOD AND APPARATUS FOR PROCESSING MESSAGES IN A UNIVERSAL MOBILE TELECOMMUNICATIONS SYSTEM

(75) Inventors: Mark Dennis Norton, Bromsgrove (GB); Andrew John Farnsworth, Bromsgrove (GB)

(73) Assignee: M-Stack Limited, Birmingham (GB)

(*) Notice: Subject to any disclaimer, the term of this patent is extended or adjusted under 35 U.S.C. 154(b) by 726 days.

(21) Appl. No.: 10/704,507

(22) Filed: Nov. 7, 2003

(65) Prior Publication Data
US 2005/0101298 A1 May 12, 2005

(51) Int. Cl.
*H04Q 7/20* (2006.01)
(52) U.S. Cl. .................. 455/435.1; 455/412.1; 455/458; 370/390; 370/310; 370/345; 370/501; 370/496
(58) Field of Classification Search .................. 455/517, 455/446, 452.2, 525, 412.1, 458, 435.1; 370/390, 370/310, 345, 501, 496
See application file for complete search history.

(56) References Cited

U.S. PATENT DOCUMENTS 6,125,123 A    9/2000   Furuno
6,826,406 B1 * 11/2004  Vialen et al. ................ 455/450
2004/0203971 A1 * 10/2004  Kuo ........................... 455/517
2005/0086466 A1 *  4/2005  Funnell et al. .............. 713/150

OTHER PUBLICATIONS

3GPP TR 25.878 v5.1.0 (Jun. 2002).*
ETSI TS 125 331 V3.10.10, Universal Mobile Telecommunications System (UMTS); Radio Resource Control (RRC) Protocol Specification, Mar. 1, 2003.
3GPP TSG-RAN WG2 Meeting #28: Interaction Between Security Mode Control and Cell Update, R2-020729, Apr. 8, 2002 (XP002279392), Kobe, Japan.
3GPP TSG-RAN WG2 Meeting #28: Ciphering Activation Time of the First TM RBs, R2-020780, Apr. 8, 2002 (XP002279393), Kobe, Japan.

* cited by examiner

*Primary Examiner*—Vincent P Harper
*Assistant Examiner*—Fred A Casca

(57) ABSTRACT

The details of an apparatus and method are disclosed for processing a message which is missing a Ciphering Activation Time for DPCH when this is required, the message being one of a number of possible messages, namely a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message.

13 Claims, 5 Drawing Sheets

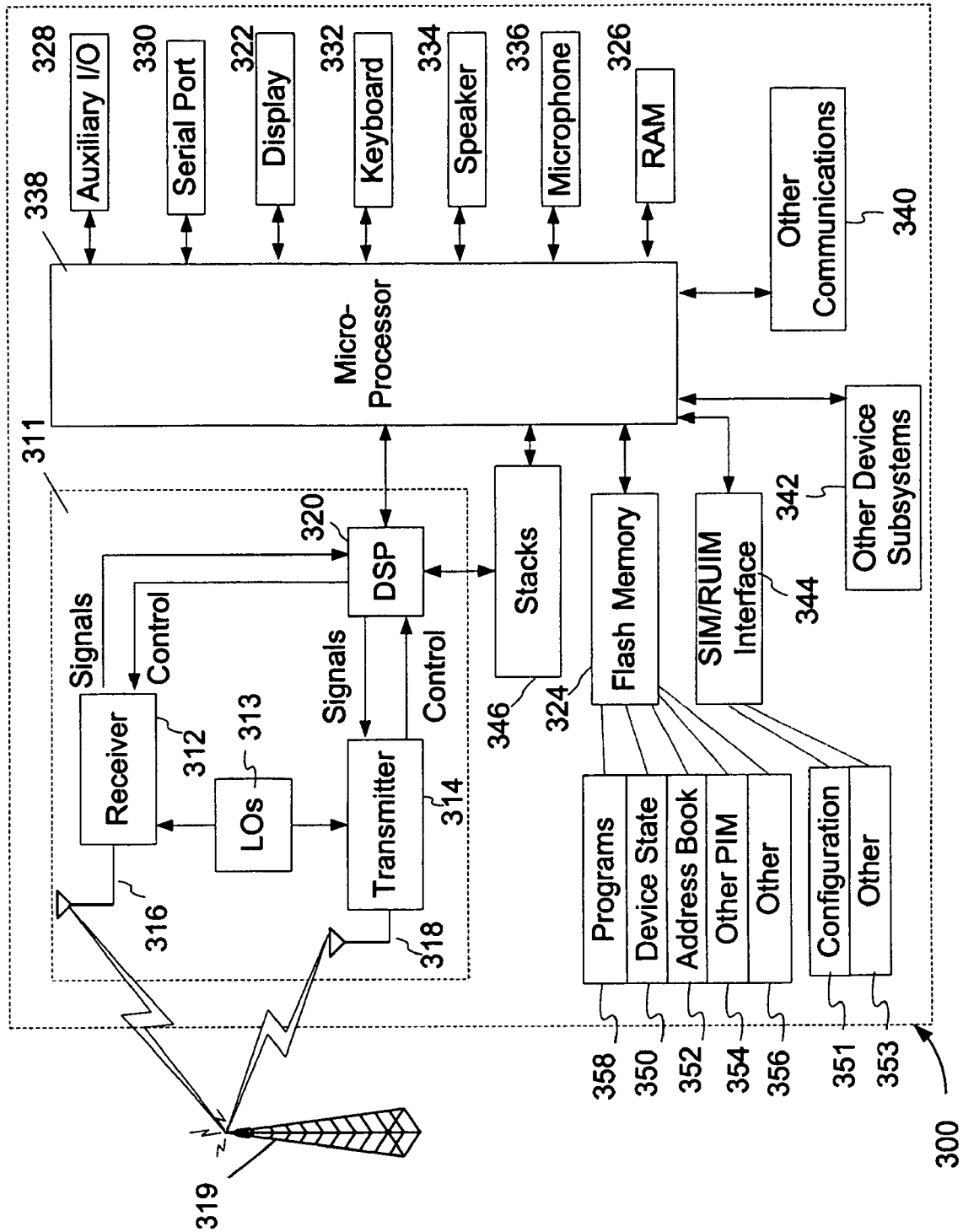
Figur 5

METHOD AND APPARATUS FOR PROCESSING MESSAGES IN A UNIVERSAL MOBILE TELECOMMUNICATIONS SYSTEM

BACKGROUND

1. Technical Field

This application relates to UMTS (Universal Mobile Telecommunications System) in general, and to a method and apparatus for processing messages in a universal mobile telecommunications system in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

The 25.331 specification describes generic processing of information elements (IEs) that are included in protocol messages. Section 8.6.3.4 describes the processing of the 'Ciphering Mode Info' IE and includes clauses that describe the IE 'Ciphering Activation Time for DPCH' that is an optional element with the 'Ciphering Mode Info' IE. This section of the specification is worded to ensure that the 'Ciphering Activation Time for DPCH' IE is present when the message being processed is a Security Mode Command message and there are Transparent Mode (TM) radio bearers in existence. Furthermore, section 8.1.12.2 of the 25.331 specification enforces behaviour on the UTRAN to state that it must include this IE in the Security Mode Command message when TM radio bearers exist.

Other messages exist that can include the 'Ciphering Mode Info' IE, in addition to the Security Mode Command message. The inventors have realised that conditions may exist in relation to these messages where the 'Ciphering Mode Activation Time for DPCH' IE would be required for the UE to exhibit logical behaviour, but no mechanism is specified for ensuring that it is available. These messages include the five reconfiguration messages specified in section 8.2.2, the Cell Update Confirm and URA Update Confirm messages described in section 8.3.1 and the UTRAN Mobility Information message specified in section 8.3.3 of the 25.331 specification.

SUMMARY

It is an object of the present application that an apparatus and method according to the invention may enable the UE to exhibit logical behaviour in response to the presence or absence of the 'Ciphering Activation Time for DPCH' information element in messages received by the UE.

According to one aspect of the present invention, there is provided a method of processing a message received at a user equipment in a UMTS communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the method comprising determining whether a Ciphering Activation Time for DPCH information element is present in the message when radio bearers exist using radio link control (RLC) transparent mode (TM) and in the event that the information element is not present, returning a message indicating the absence of the information element.

The absence of the Ciphering Activation Time for DPCH information element may be indicated by transmitting a response message to the UTRAN with an error return value of INVALID_CONFIGURATION or UNSUPPORTED_CONFIGURATION.

According to a second aspect of the invention, there is provided a method of preparing a message for transmission to a user equipment in a UMTS communications system, the message including a Ciphering Mode Info information element, the method comprising determining whether radio bearers exist using radio link control (RLC) transparent mode (TM) and if they do exist, determining whether the message is one of a plurality of message types for which a Ciphering Activation Time for DPCH information element is to be included, the plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, and in the event the message is one of said plurality of message types, including the Ciphering Activation Time for DPCH information element in the message.

According to a third aspect of the invention, there is provided a method of processing a message received at a user equipment in a UMTS communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the method comprising determining whether a Ciphering Activation Time for DPCH information element is present in the message when radio bearers exist using radio link control (RLC) transparent mode (TM) and in the event that the information element is not present, selecting an activation time for applying ciphering changes for the transparent mode radio bearers.

The step of selecting the activation time may comprise using a message activation time received from the UTRAN.

The method may further comprise returning a response message to the UTRAN including an activation time selected at the UE, using, for example, the COUNT-C Activation Time information element.

The method may also comprise using an activation time of 'NOW' to immediately apply ciphering changes at the UE.

According to a further aspect of the invention, there is provided user equipment for receiving a message in a UMTS communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the user equipment comprising a control module configured to determine whether a Ciphering Activation Time for DPCH information element is present in the message when radio bearers exist using radio link control (RLC) transparent mode (TM) and a transmitter for returning a message indicating the absence of the information element, in the event that the Ciphering Activation Time for DPCH information element is not present.

According to a yet further aspect of the invention, there is provided a UTRAN for transmitting a message to a user equipment in a UMTS communications system, the message including a Ciphering Mode Info information element, the UTRAN comprising a control module configured to determine whether radio bearers exist using radio link control (RLC) transparent mode (TM) and to determine, in the event that said radio bearers exist, whether the message is one of a plurality of message types for which a Ciphering Activation Time for DPCH information element is to be included, the plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the control module further being configured to include the Ciphering Activation Time for DPCH information element in the message in the event that the message is one of said plurality of message types.

The invention still further provides user equipment (UE) for receiving a message from a UTRAN in a UMTS communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the user equipment comprising a control module configured to determine whether a Ciphering Activation Time for DPCH information element is present in the message when radio bearers exist using radio link control (RLC) transparent mode (TM), the control module further being configured to select an activation time for applying ciphering changes for the transparent mode radio bearers, in the event that the information element is not present.

BRIEF DESCRIPTION OF THE DRAWINGS

Embodiments of the present invention will now be described, by way of example only, with reference to the attached drawings, in which:

FIG. 5 is a block diagram illustrating a mobile device, which can act as a UE and co-operate with the apparatus and methods of FIGS. 1 to 4.

The same reference numerals are used in different figures to denote similar elements.

DETAILED DESCRIPTION OF THE DRAWINGS

Figure 1:
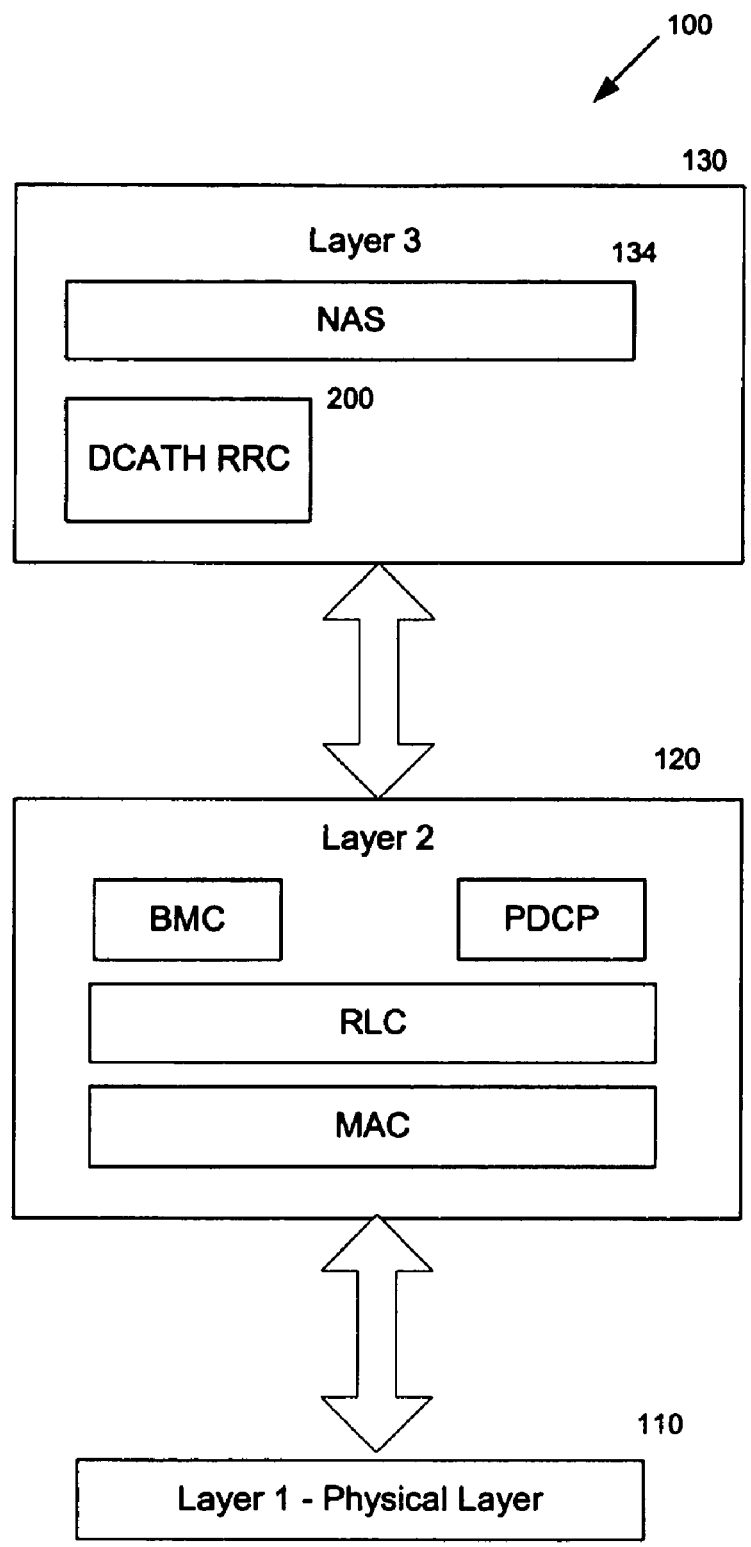
FIG. 1 is a block diagram illustrating an embodiment of a protocol stack apparatus provided with a DPCH ciphering activation time handling Radio Resource Control module (DCATH RRC), in accordance with the present invention.

Referring to the drawings, FIG. 1 is a block diagram illustrating an embodiment of a protocol stack apparatus provided with a DPCH ciphering activation time handling Radio Resource Control module (DCATH RRC), in accordance with the present invention.

The DCATH RRC module 200 is a sub layer of Layer 3 130 of a UMTS protocol stack 100. The DCATH RRC 200 exists in the control plane only and provides an information transfer service to the non-access stratum NAS 134. The DCATH RRC 200 is responsible for controlling the configuration of radio interface Layer 1 110 and Layer 2 120. The UTRAN issues one of a plurality of possible messages to the UE that may include the 'Ciphering Mode Info' information element described in Section 8.6.3.4 of the 25.331 specification. The messages are a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message.

The DCATH RRC 200 layer of the UE decodes this message and checks whether the Ciphering Activation Time for DPCH information element is present if required. If it is, it initiates the appropriate RRC procedure which procedure may require the DCATH RRC 200 to send a response message to the UTRAN (via the lower layers) informing the UTRAN of the outcome of the procedure. If the Ciphering Activation Time for DPCH information element is absent but required for the procedure, the DCATH RRC block 200 takes the appropriate action, as described in detail below.

Advantageously, the DCATH RRC module 200 allows the protocol stack 100 to behave unambiguously in the event that one of the above-mentioned messages is received from the UTRAN.

Figure 2:
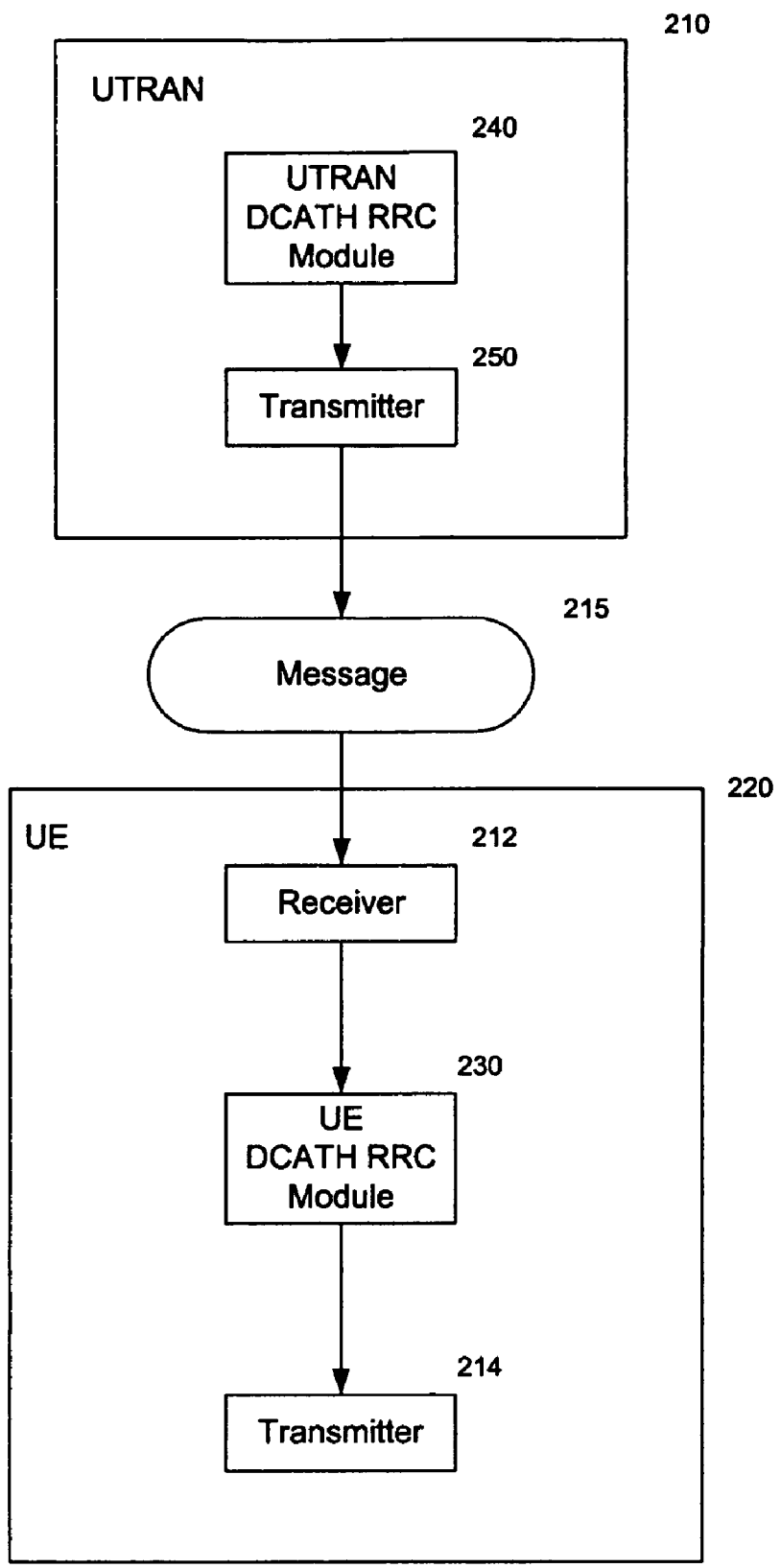
FIG. 2 is a block diagram illustrating the DCATH RRC 200 module of FIG. 1 in the context of a UE and UTRAN.
Figure 3:
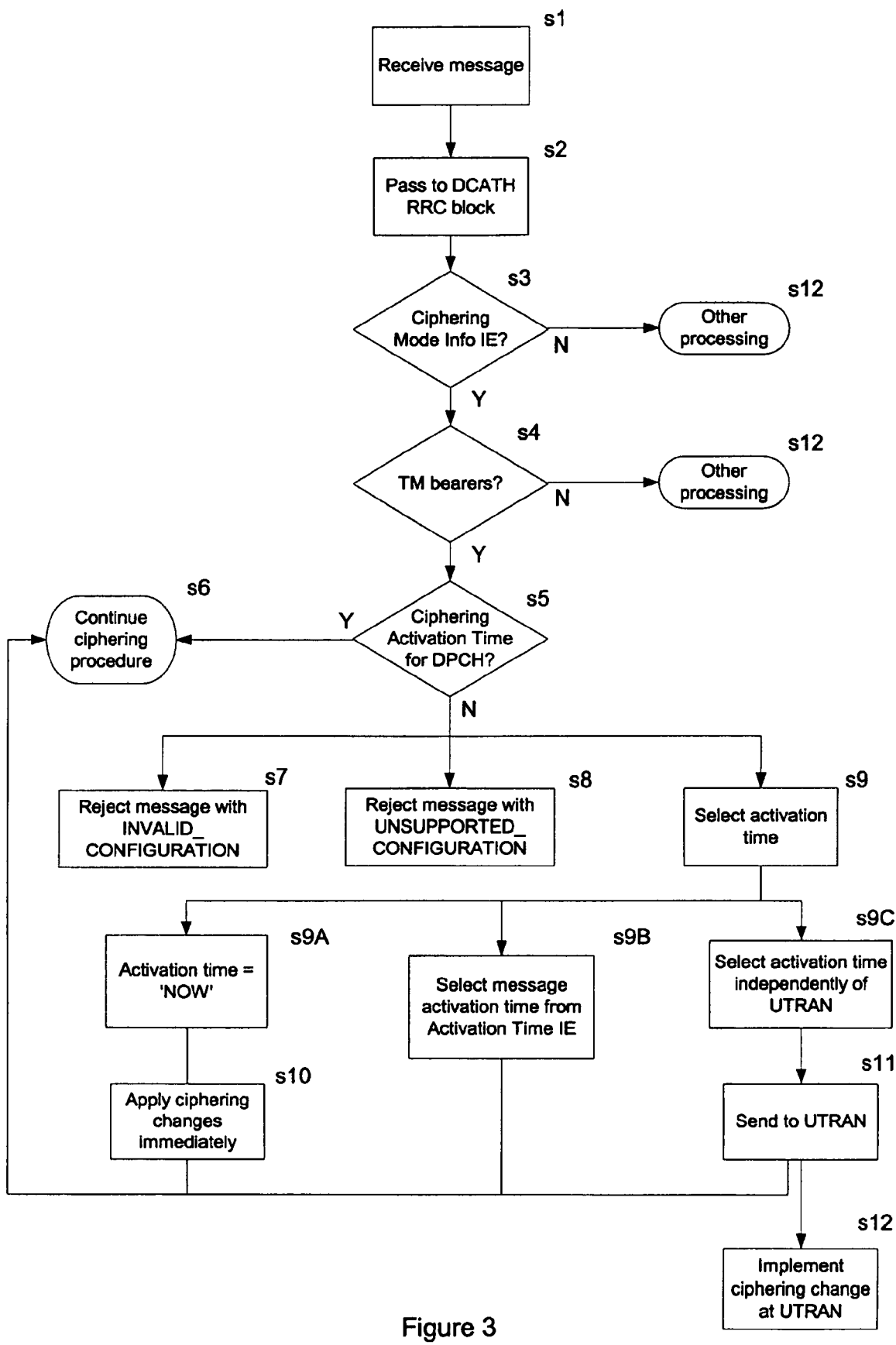
FIG. 3 is a flow diagram illustrating the processing carried out by a UE DCATH RRC module on receipt at the UE of a message from the UTRAN that may include the Ciphering Mode Info IE.

FIG. 2 is a block diagram illustrating the DCATH RRC 200 module of FIG. 1 in the context of a UE and UTRAN, while FIG. 3 is a flow diagram illustrating the processing carried out by a UE DCATH RRC module on receipt at the UE of a message from the UTRAN that may include the Ciphering Mode Info IE.

A UTRAN 210 sends a message 215 that is received by a receiver 212 in the UE 220 (step s1). The message is one of the eight possible messages set out above, being a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message. The message is passed to the UE DCATH RRC block 230 for processing (step s2). The UE DCATH RRC module 230 first determines whether the message includes the IE 'Ciphering Mode Info' (step s3). If so, it determines whether radio bearers exist which use the RLC transparent mode (TM) (step s4). If so, the UE DCATH RRC module 230 checks for the presence of the IE 'Ciphering Activation Time for DPCH' (step s5). If this is present, the procedure continues and the new ciphering configuration can be applied as set out in the 25.331 specification (step s6). If the answers to the tests posed at steps s3 and s4 are negative, other appropriate processing of the message will continue in accordance with the procedures set out in the 25.331 specification (step s12).

If the test at step s5 indicates that the IE 'Ciphering Activation Time for DPCH' is absent, the UE DCATH RRC module 230 can implement one of a number of possible procedures.

In a first embodiment, the UE DCATH RRC module 230 rejects the message and sends a response to the UTRAN via a transmitter 214 with an error return value of INVALID_CONFIGURATION (step s7).

In a second embodiment, the UE DCATH RRC module 230 rejects the message and sends a response to the UTRAN with an error return value of UNSUPPORTED_CONFIGURATION (step s8).

In a third embodiment, the UE DCATH RRC module 230 selects a suitable activation time for implementation of the ciphering configuration (step s9). The activation time may be the special value 'Now' (step s9A), so that the UE applies the ciphering changes immediately (step s10) and the ciphering procedure continues (step s6). In this case, the UTRAN is required to decide on a suitable time to start ciphering. The activation time selected may alternatively be the message activation time supplied by the UTRAN in the IE 'Activation Time' (step s9B). As before, following this selection, the ciphering procedure can continue (step s6). In this case, the UTRAN is assumed to implement the same behaviour.

In a further embodiment, the UE DCATH RRC module 230 selects the activation time independently of the UTRAN (step s9C), for example, using a method similar to that specified in section 8.2.2.3 of the 25.331 specification, namely including the IE 'COUNT-C activation time' and specifying a connection frame number (CFN) value for this IE that is a multiple of 8 frames (CFN mod 8=0) and lies at least 200 frames ahead of the CFN in which the response message is first transmitted. In contrast to the embodiments described above with reference to steps 9A and 9B, the selected activation time is transmitted to the UTRAN with the response message using the IE 'COUNT-C Activation Time' (step s11). Following transmission, the ciphering procedure can continue at the UE (step 6), while the UTRAN uses the transmitted activation time to implement the ciphering change (step s12).

Figure 4:
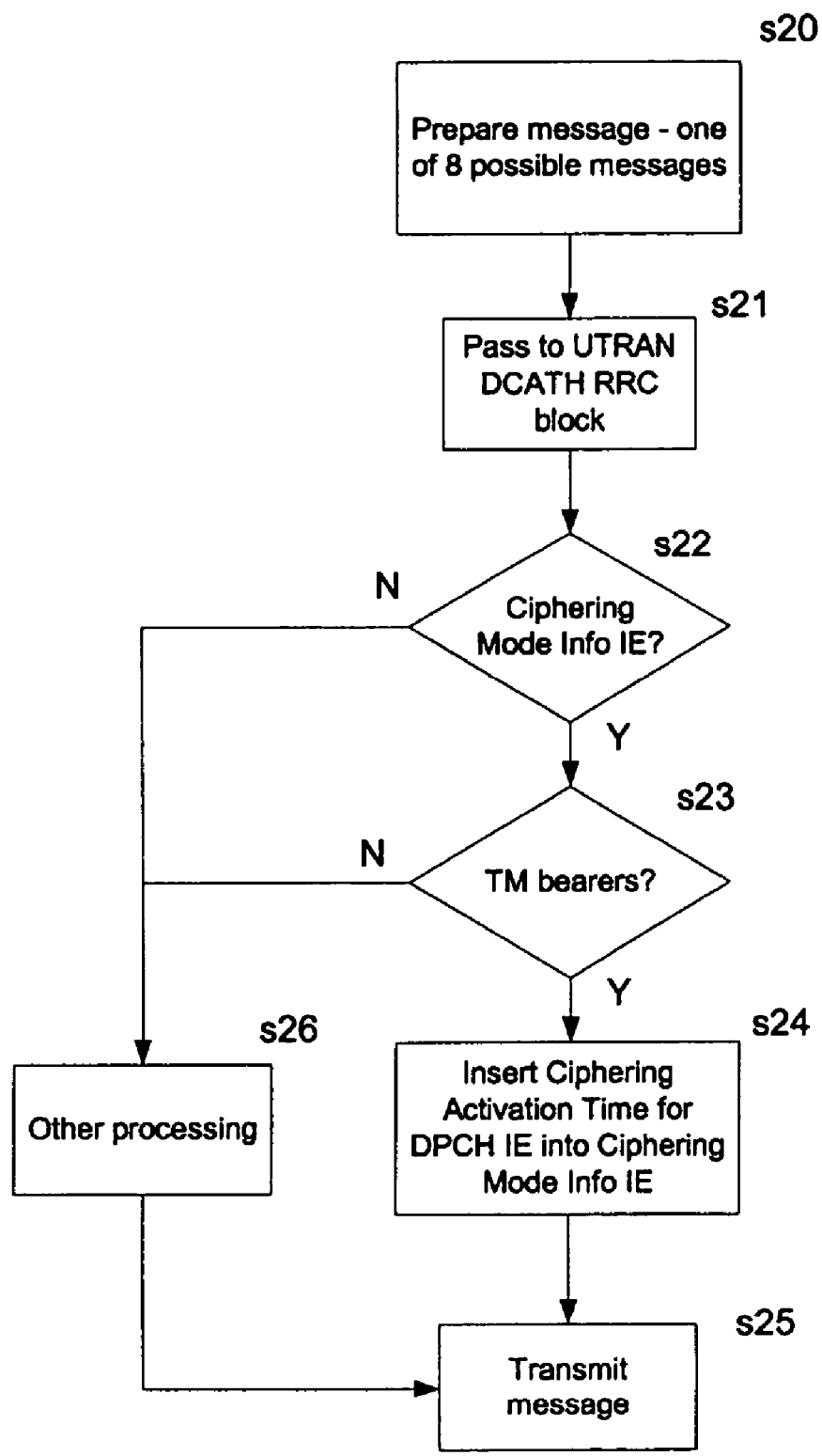
FIG. 4 shows the steps carried out by a UTRAN DCATH RRC module to ensure that the IE 'Ciphering Activation Time for DPCH' is included in messages where this is required.

While examples of the process of implementing the invention at the UE have been described above, it is alternatively possible to implement the invention at the UTRAN. This example of the invention is illustrated with reference to FIGS. 2 and 4. FIG. 4 shows the steps carried out by a UTRAN DCATH RRC module to ensure that the IE 'Ciphering Activation Time for DPCH' is included in messages where this is required.

The UTRAN 210 includes a UTRAN DCATH RRC module 240. When a message is being prepared to be sent to the UE (step s20), which is one of the eight messages specified above, namely a Radio Bearer Setup message, a Radio Bearer Reconfiguration message, a Radio Bearer Release message, a Transport Channel Reconfiguration message, a Physical Channel Reconfiguration message, a Cell Update Confirm message, a URA Update Confirm message and a UTRAN Mobility Information message, the message is passed to the UTRAN DCATH RRC module 240 (step s21). This determines whether the 'Ciphering Mode Info' information element exists (step s22). If it does, the UTRAN DCATH RRC module 240 checks for the existence of TM radio bearers (step s23). If these exist, the UTRAN DCATH RRC module 240 inserts a 'Ciphering Activation Time for DPCH' IE into the 'Ciphering Mode Info' IE (step s24) and transmits the message to the UE (step s25) via the UTRAN transmitter 250.

In the event that the answers to the tests at step s22 and s23 are negative, any other required processing is then performed for the message (step s26) and the message is transmitted (step s25).

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 300 is preferably a two-way wireless communication device having at least voice and data communication capabilities. Mobile station 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, mobile station 300 may include a communication subsystem 311 designed to operate within the Mobitex™ mobile communication system, the DataTAC™ mobile communication system, a GPRS network, a UMTS network, or an EDGE network.

Network access requirements will also vary depending upon the type of network 319. For example, in the Mobitex and DataTAC networks, mobile station 300 is registered on the network using a unique identification number associated with each mobile station. In UMTS and GPRS networks, however, network access is associated with a subscriber or user of mobile station 300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 300 will be unable to carry out any other functions involving communications over the network 300. The SIM interface 344 is normally similar to a card-slot into which a SIM card can be inserted and ejected like a diskette or PCMCIA card. The SIM card can have approximately 64K of memory and hold many key configuration 351, and other information 353 such as identification, and subscriber related information.

When required network registration or activation procedures have been completed, mobile station 300 may send and receive communication signals over the network 319. Signals received by antenna 316 through communication network 319 are input to receiver 312, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile station 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile station. A predetermined set of applications that control basic operations, including at least data and voice communication applications for example, will normally be installed on mobile station 300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile station user's corresponding data items stored or associated with a host computer system. Further applications may also be loaded onto the mobile station 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile station 300.

In a data communication mode, a received signal such as a text message or web page download will be processed by the communication subsystem 311 and input to the microprocessor 338, which preferably further processes the received signal for output to the display 322, or alternatively to an auxiliary I/O device 328. A user of mobile station 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile station 300 is similar, except that received signals would preferably be output to a speaker 334 and signals for transmission would be generated by a microphone 336. Alternative voice or audio I/O subsystems, such as a voice message recording subsystem, may also be implemented on mobile station 300. Although voice or audio signal output is preferably accomplished primarily through the speaker 334, display 322 may also be used to provide an indication of the identity of a calling party, the duration of a voice call, or other voice call related information for example.

Serial port 330 in FIG. 5, would normally be implemented in a personal digital assistant (PDA)-type mobile station for which synchronization with a user's desktop computer (not shown) may be desirable, but is an optional device component. Such a port 330 would enable a user to set preferences through an external device or software application and would extend the capabilities of mobile station 300 by providing for information or software downloads to mobile station 300 other than through a wireless communication network. The alternate download path may for example be used to load an encryption key onto the device through a direct and thus reliable and trusted connection to thereby enable secure device communication.

Other communications subsystems 340, such as a short-range communications subsystem, is a further optional component which may provide for communication between mobile station 300 and different systems or devices, which need not necessarily be similar devices. For example, the subsystem 340 may include an infrared device and associated circuits and components or a Bluetooth™ communication module to provide for communication with similarly enabled systems and devices.

When mobile device 300 is used as a UE, protocol stacks 346 include a method and apparatus for processing messages in a universal mobile telecommunications system.

The above-described embodiments of the present application are intended to be examples only. Those of skill in the art may effect alterations, modifications and variations to the particular embodiments without departing from the scope of the application as defined by the appended claims.

We claim:

1. A method of processing a message received at a user equipment (UE), the UE configured for use in a UMTS, Universal Mobile Telecommunications System, communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA, UTRAN Registration Area, Update Confirm message and a UTRAN, Universal Terrestrial Radio Access Network, Mobility Information message, the method comprising:

determining whether a Ciphering Activation Time for DPCH, Dedicated Physical Channel, information element that identifies a ciphering activation time is present in the message when radio bearers exist using radio link control (RLC) transparent mode (TM); and in the event that the Ciphering Activation Time for DPCH information element is not present, refraining from acting on the message and returning a message with an error return value indicating the absence of the information element.

2. A method according to claim 1, wherein the step of returning a message indicating the absence of the Ciphering Activation Time for DPCH information element comprises returning a message including the value INVALID_CONFIGURATION.

3. A method according to claim 1, wherein the step of returning a response message indicating the absence of the Ciphering Activation Time for DPCH information element comprises returning a message including the value UNSUPPORTED_CONFIGURATION.

4. A method of processing a message received at a user equipment (UE) from a UTRAN, Universal Terrestrial Radio Access Network, configured for use in a UMIS, Universal Mobile Telecommunications System, communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA, UTRAN Registration Area, Update Confirm message and a UTRAN Mobility Information message, the method comprising:

determining whether a Ciphering Activation Time for DPCH, Dedicated Physical Channel, information element that identifies a ciphering activation time is present in the message when radio bearers exist using radio link control (RLC) transparent mode (TM); and in the event that the information element is not present, selecting an activation time for applying ciphering changes for the transparent mode radio bearers, and returning the selected activation time using a COUNT-C Activation Time information element.

5. A method according to claim 4, wherein the step of selecting the activation time for applying ciphering changes comprises using a message activation time received from the UTRAN.

6. A method according to claim 5, wherein the message activation time is included in the Activation Time information element.

7. A method according to claim 6, comprising, in the absence of the Activation Time information element, using an activation time of NOW.

8. A method according to claim 4, wherein the step of selecting an activation time comprises selecting an activation time at the UE independently of the UTRAN and sending a response message including the selected activation time to the UTRAN.

9. A method according to claim 8, further comprising using the selected activation time at the UE as the time for applying ciphering changes for transparent mode radio bearers.

10. A method according to claim 9, further comprising receiving the selected activation time at the UTRAN and using the received activation time as the time for applying ciphering changes for transparent mode radio bearers.

11. A method according to claim 4, comprising selecting an activation time of NOW to immediately apply ciphering changes for transparent mode radio bearers.

12. User equipment (UE) for receiving a message and configured for use in a UMTS, Universal Mobile Telecommunications System, communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA, UTRAN Registration Area, Update Confirm message and a UTRAN, UMTS Terrestrial Radio Access Network, Mobility Information message, the user equipment comprising:

a control module configured to determine whether a Ciphering Activation Time for DPCH information element that identifies a ciphering activation time is present in the message when radio bearers exist using radio link control (RLC) transparent mode (TM) and to refrain from acting on the message if the ciphering Activation Time for DPCH information element is not present; and a transmitter for returning a response message with an error return value indicating the absence of the information element, in the event that the Ciphering Activation Time for DPCH, Dedicated Physical Channel, information element is not present.

13. User equipment (UE) for receiving a message from a UTRAN, Universal Terrestrial Radio Access Network, and configured for use in a UMTS, Universal Mobile Telecommunications System, communications system, wherein the message includes a Ciphering Mode Info information element and is one of a plurality of message types comprising a Radio Bearer Setup message, a Radio Bearer Reconfiguration message, a Radio Bearer Release message, a Transport Channel Reconfiguration message, a Physical Channel Reconfiguration message, a Cell Update Confirm message, a URA, UTRAN Registration Area, Update Confirm message and a UTRAN Mobility Information message, the user equipment comprising:

a control module for determining whether a Ciphering Activation Time for DPCH, Dedicated Physical Channel, information element is present in the message when radio bearers exist using radio link control (RLC) transparent mode (TM);

the control module being configured to select an activation time for applying ciphering changes for the transparent mode radio bearers, in the event that the information element is not present and to return the selected activation time using a COUNT-C Activation Time information element.

\* \* \* \* \*

UNITED STATES PATENT AND TRADEMARK OFFICE
CERTIFICATE OF CORRECTION

| | | |
|---|---|---|
| PATENT NO. | : 7,738,867 B2 | Page 1 of 1 |
| APPLICATION NO. | : 10/704507 | |
| DATED | : June 15, 2010 | |
| INVENTOR(S) | : Mark Dennis Norton et al. | |

It is certified that error appears in the above-identified patent and that said Letters Patent is hereby corrected as shown below:

Col. 9, Claim 4, Line 29, please delete "UMIS" and insert --UMTS--.

Signed and Sealed this

Twenty-fourth Day of August, 2010

David J. Kappos
*Director of the United States Patent and Trademark Office*